June 25, 1946.    R. L. TWEEDALE    2,402,789
POWER TRANSMISSION
Filed Aug. 14, 1937    6 Sheets-Sheet 3
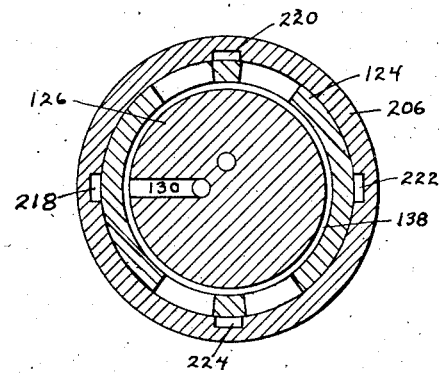
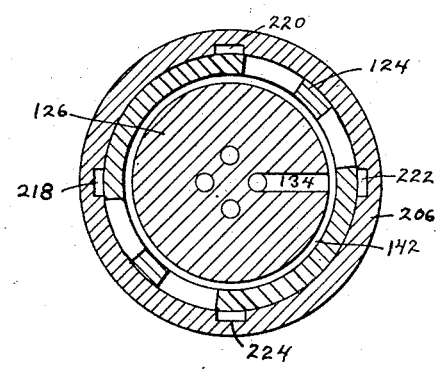
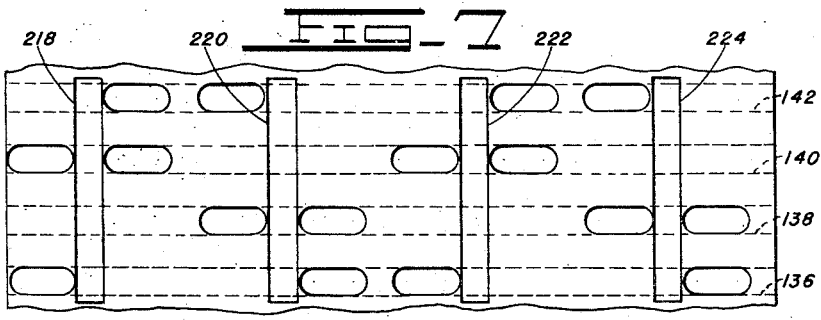
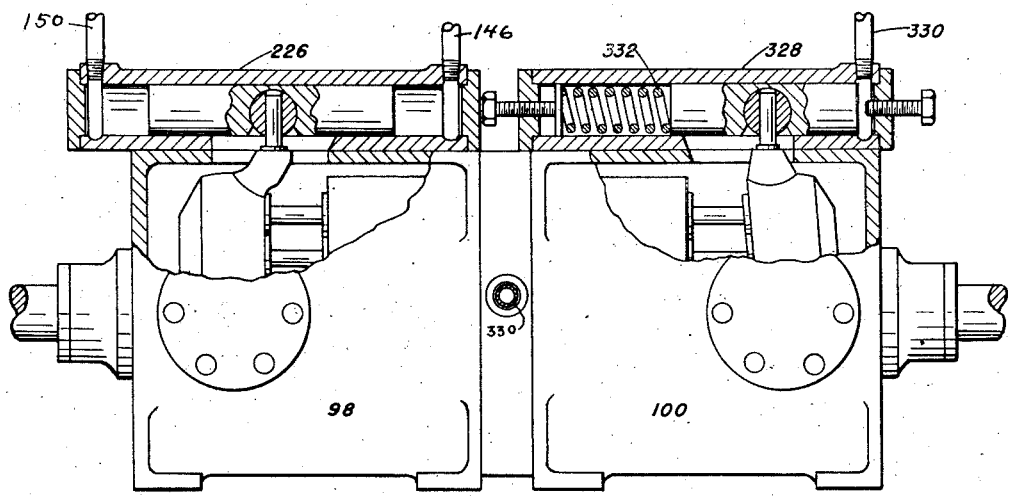
INVENTOR
Ralph L. Tweedale

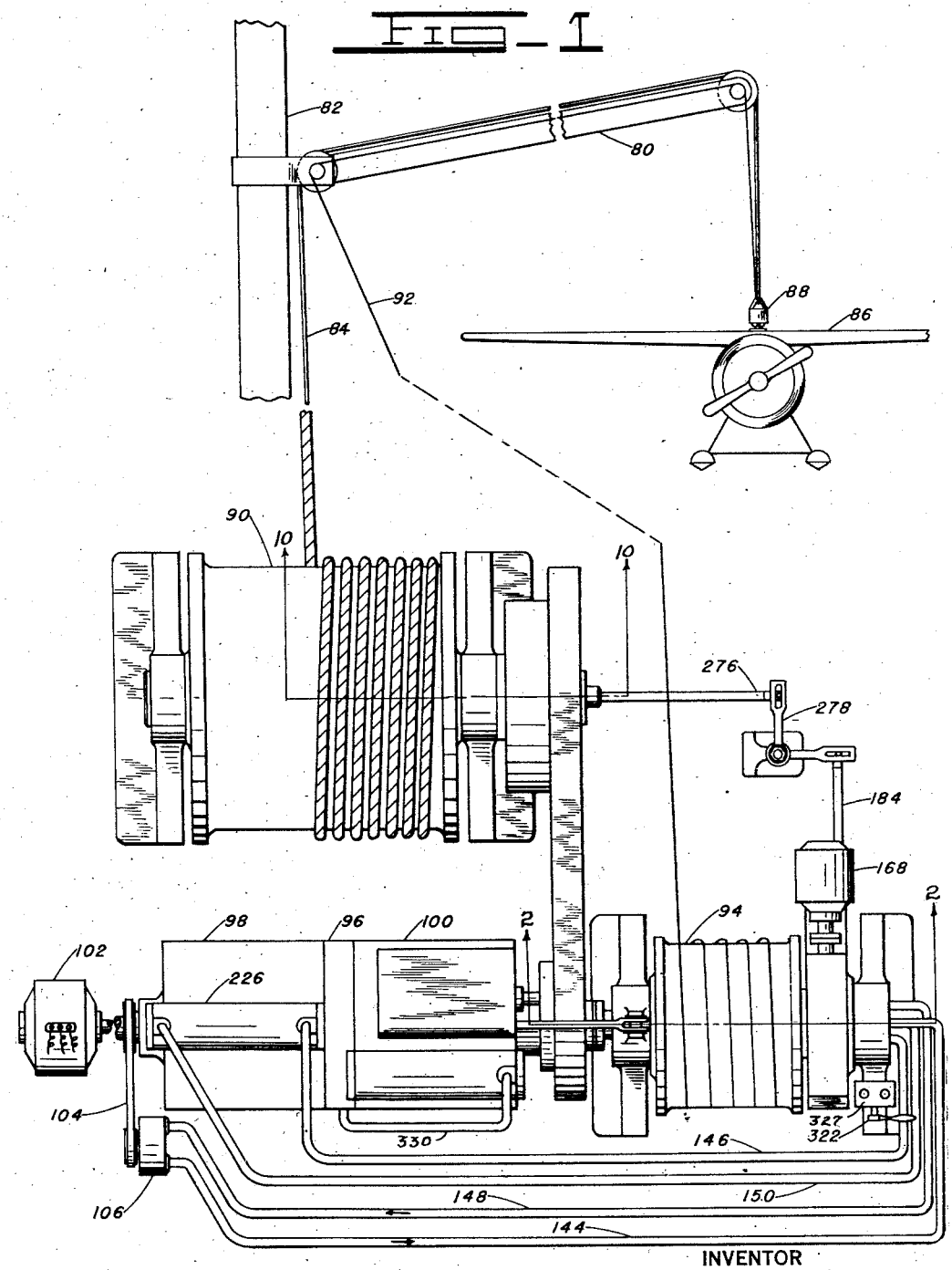

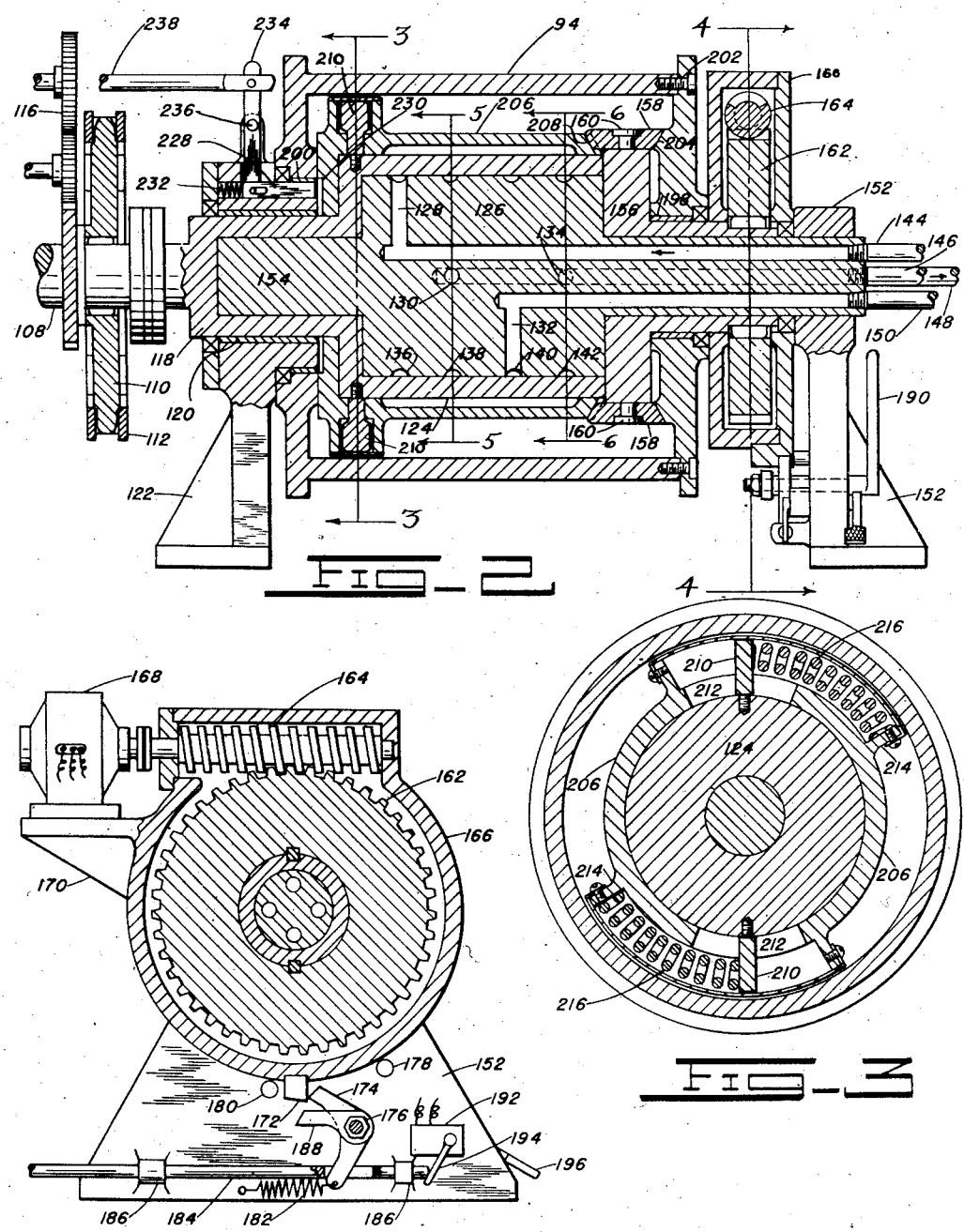

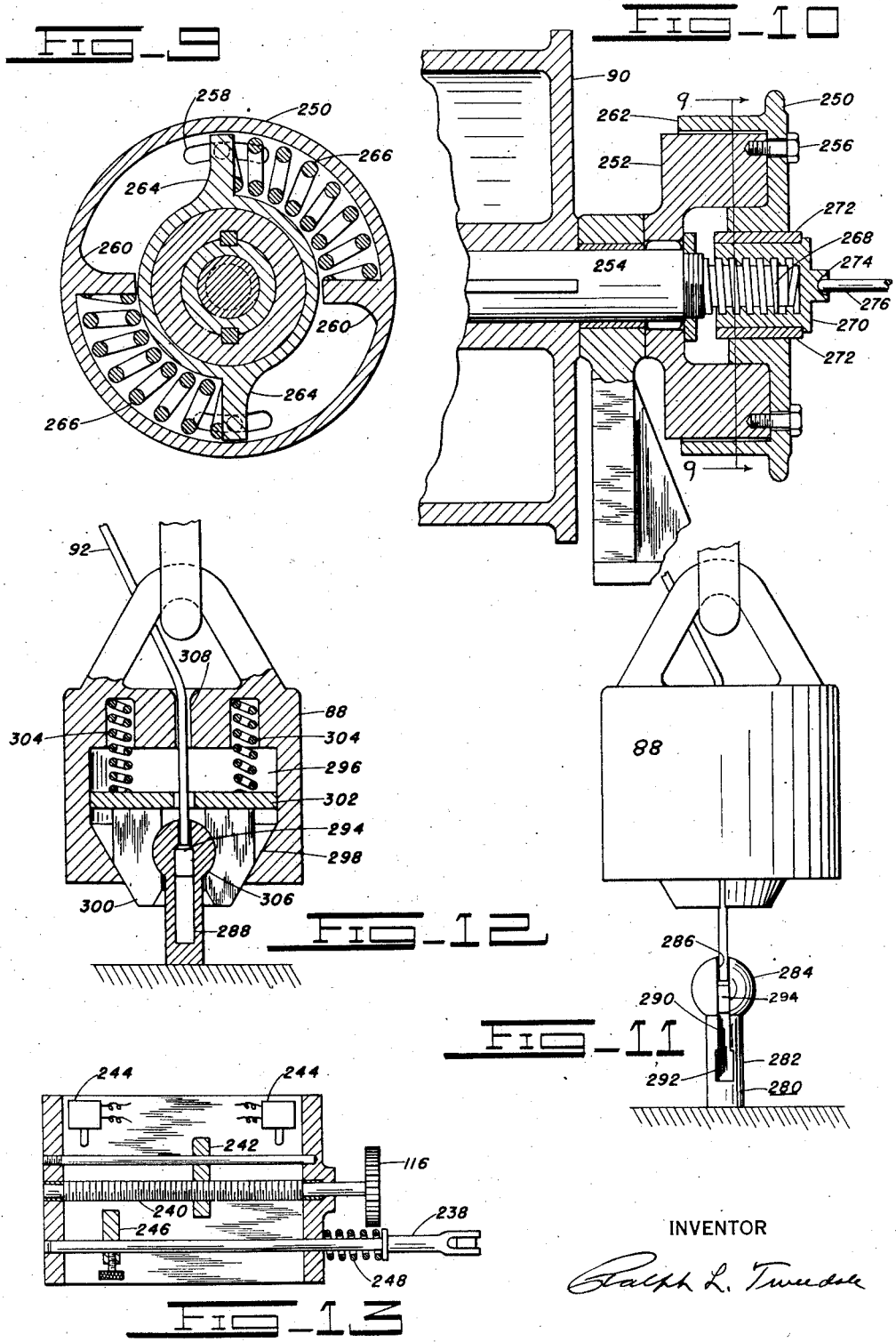

June 25, 1946.  R. L. TWEEDALE  2,402,789
POWER TRANSMISSION
Filed Aug. 14, 1937  6 Sheets-Sheet 5
FIG_14
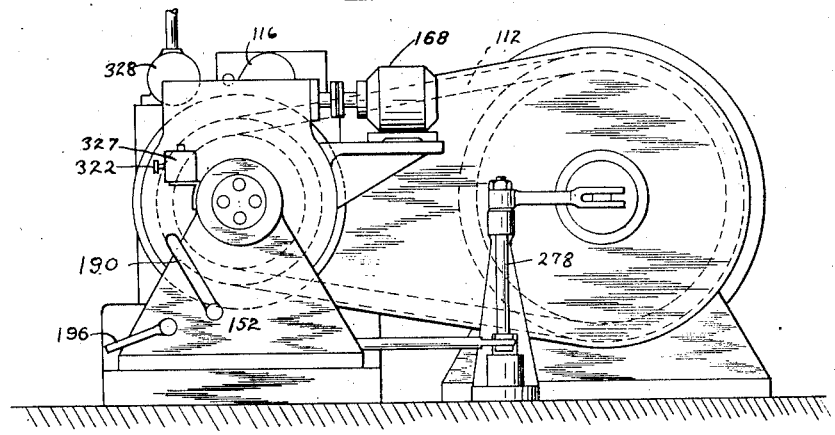
FIG_15
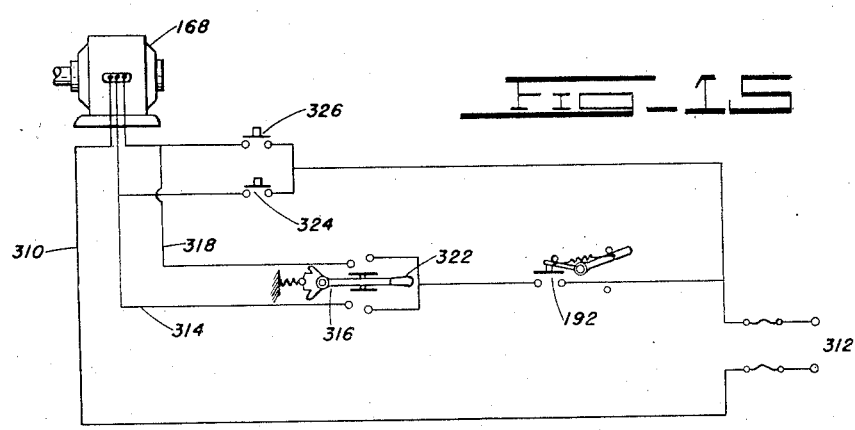
FIG_16
INVENTOR
*Ralph L. Tweedale*

INVENTOR
Ralph L. Tweedale

Patented June 25, 1946

2,402,789

UNITED STATES PATENT OFFICE 2,402,789

POWER TRANSMISSION

Ralph L. Tweedale, Waterbury, Conn., assignor to The Waterbury Tool Company, Waterbury, Conn., a corporation of Connecticut Application August 14, 1937, Serial No. 159,199

13 Claims. (Cl. 214—95)

This invention relates to power transmissions and more particularly to those of the type comprising two or more fluid pressure energy translating devices, one of which may function as a pump and the other as a motor. The invention is particularly directed toward the provision of a transmission of this character and to a control system therefor, which is adapted for use in driving a winch for lifting an object, such as a boat or airplane, floating in a seaway, to the deck of a ship or to a stationary platform, such as a pier. The invention is shown and described as adapted for this use although it is understood that the invention can be used for other purposes.

Many devices have been proposed for satisfactorily picking a floating object off from the water and many have recognized the necessity of preventing the occurrence of slack in the line by which the object is picked up. If any slack is permitted to develop, the constant up and down motion of the object on the waves will cause a violent jerk as the slack is taken up and it may be of sufficient magnitude to rupture the hoisting line or to pull the attaching connections out of the object being lifted. The avoidance of this difficulty has heretofore been taken care of by the provision of control means for causing the winch to exert a predetermined tension on the hoisting cable after it has been attached to the object, this tensioning being maintained for a considerable interval preparatory to picking the object off the water. It is necessary therefore with the devices of the prior art to perform the lifting operation in three definite stages. During the first stage, the hook is lowered to the object and manually engaged with a ring on the object while the hoisting line is generously slack. During the second stage, the slack is taken up and the cable is maintained at a constant tension sufficient to keep the cable taut while the object rides up and down on the waves. During the third stage, the constant tension control mechanism is disabled and the winch is caused to positively hoist the object off from the water. The transfer from constant tension operation to positive hoisting has heretofore been made manually; in which case it is necessary for the operator to judge the proper instant at which the change-over should be made.

The present invention aims to eliminate the period of constant tension operation preliminary to picking the object off the water. To accomplish this, a pilot cable is provided which may be reeled out and the end attached to the object to be lifted. The pilot cable is maintained taut by a mechanism at the winch and while thus tensioned a special coupling member attached to the hoisting line is lowered to the object, sliding along the pilot cable as a guide. Preferably the pilot cable is so connected to the winch control mechanism that it operates to impress upon the control mechanism the up and down movements of the object on the waves and causes the coupling member to be lowered toward the object at a rate which is independent of the wave motions. The coupling member is so constructed as to automatically engage with another coupling member carried by the object whenever the two are brought together and a lifting force is exerted on the coupling member attached to the hoisting line. A lifting connection is thus automatically established during an instant just after the object begins to move downwardly relative to the coupling member. This downward motion of the object relative to the coupling member occurs during the interval while the object is moving upwardly relative to the boom but is being decelerated; that is, while the object is approaching the crest of a wave. The nature of the automatic coupling means is such that the lifting connection can be established only under these conditions. This interval is the only one during which it is possible to begin lifting the object from the water without causing a dangerous jerk on the line. By the provision of an automatic coupling means of this character, the pick-off point is thereby automatically established at the proper instant without requiring a period during which the hoisting connections remain established and the plane or the object rides up and down on the waves at a constant light tension on the hoisting line.

Further objects and advantages of the present invention will be apparent from the following description, reference being had to the accompanying drawings wherein a preferred form of the present invention is clearly shown.

In the drawings:

Fig. 1 is a diagrammatic view of the airplane crane incorporating a preferred form of the present invention.

Fig. 2 is a cross section on line 2—2 of Fig. 1.
Fig. 3 is a cross section on line 3—3 of Fig. 2.
Fig. 4 is a cross section on line 4—4 of Fig. 2.
Fig. 5 is a cross section on line 5—5 of Fig. 2.
Fig. 6 is a cross section on line 6—6 of Fig. 2.
Fig. 7 is a fragmentary developed view of the follow-up valve shown in Fig. 2.
Fig. 8 is a side view partially in section of a hydraulic transmission incorporated in the winch of Fig. 1.

Fig. 9 is a cross section through a torque measuring mechanism being taken on line 9—9 of Fig. 10.

Fig. 10 is a fragmentary cross section on line 10—10 of Fig. 1.

Fig. 11 is a detailed view of the automatic coupling means forming part of the present invention.

Fig. 12 is a cross sectional view of the parts in Fig. 11, showing them in a different position.

Fig. 13 is a detailed view of a limit stop mechanism incorporated in the winch structure.

Fig. 14 is an end view of the winch mechanism.

Fig. 15 is an electrical circuit diagrammatically showing the control circuit for a pilot electric motor.

Fig. 16 is a diagrammatic illustration showing the rudiments of a winch driving and control system incorporating the present invention and showing the parts in the positions occupied when the pilot cable is being lowered to the object.

Figure 17:
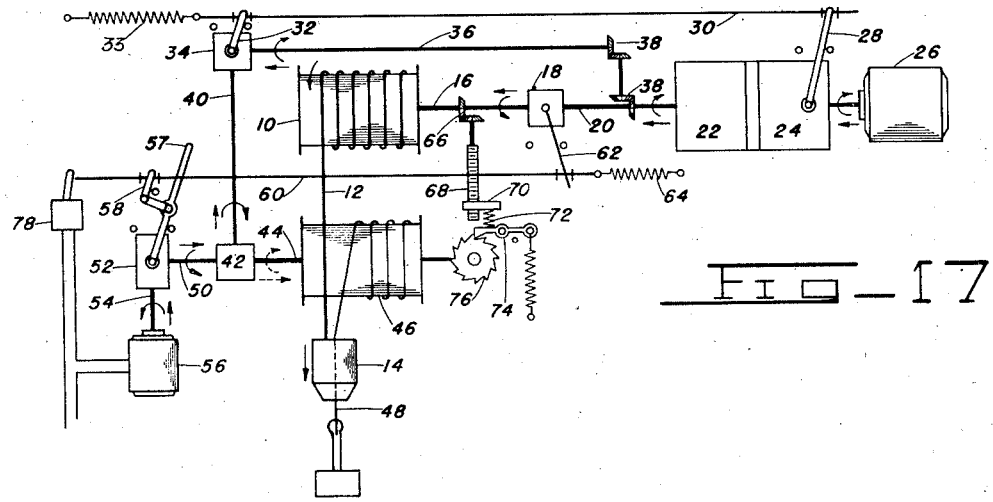
Fig. 17 is a view corresponding to Fig. 16, showing the parts in the positions occupied while the hoist line is being lowered to the object.

Referring now to Fig. 16 through 19, there is shown diagrammatically a winch driving and control system which will serve best to illustrate the principles upon which the present invention operates. The mechanism illustrated in Figs. 16 through 19 is intended as schematic only and has been chosen for clarity of illustration rather than for practical suitability for its intended purpose; certain liberties being taken in illustrating the parts for sake of clearness. The winch may comprise a main hoisting drum 10, on which is wound the hoisting line 12, carrying an automatic coupling member 14. The drum 10 is operated by a shaft 16, which is connected to a differential gear indicated at 18. One of the two other shaft connections to the differential 18 is the shaft 20, which is connected to the fluid motor 22 operated on fluid supplied by the variable displacement pump 24. The latter is driven by an electric motor prime mover indicated at 26. The displacement of the pump may be controlled by a stroke controlling lever 28 which is connected by a link 30 to a lever 32 connected to one portion of a differential gear 34. A light spring 33 urges lever 32 counterclockwise. A shaft 36 connects through bevel gearing 38 between shaft 20 and one member of the differential 34. The third member of the differential 34 is connected to shaft 40 which is connected to a differential 42. One member of the differential 42 is connected by shaft 44 with a pilot drum 46 having wound thereon a pilot cable 48 the end of which may be attached to the object to be lifted. The third member of the differential 42 is connected by a shaft 50 to a differential 52 which has one member connected to a lever 57 and another member connected by a shaft 54 to a pilot electric motor 56. A detent 58 retains the lever 57 in the position illustrated in Fig. 16 and may be released by a push rod 60 at certain times. The push rod 60 is connected to a lever 62 which in turn is connected to the third member of the differential 18. A heavy spring 64 biases the lever 62 to the position illustrated in Fig. 16. Connected to the drum 10 by bevel gearing 66 is a screw shaft 68 carrying a travelling nut 70 which is engageable by a compression spring 72 with a detent 74 which operates on a ratchet wheel 76 connected to the pilot drum 46. A limit switch 78 is placed in the circuit of the pilot motor 56 and is operable to "off" position whenever the push rod 60 releases the detent 58.

It will be noted that the shaft 20 of the variable speed transmission 22, 24 is connected to the hoist drum 10 and thus to the object to be lifted and through a differential connection 18 which also connects with the force measuring element comprising the spring 64. The spring 64 is of such strength as to remain contracted while the coupler 14 is not connected to the object and to yield whenever a substantial portion of the weight of the object is carried by the hoisting line 12. The action of the differential 18 and the spring 64 is analogous to that of a torsion dynamometer. The lever 28 which controls the speed and direction of movement of the shaft 20 is under the conjoint control of several other elements of the mechanism illustrated. Thus the position of the lever 28 depends upon the position of the lever 32 which in turn depends upon the difference in relative positions of the shaft 20 and the output shaft 40 at the differential 42. Shaft 40 likewise moves in accordance with the difference in position between the shafts 50 and 44, the former being connected through differential 52 to the pilot motor 56 and the latter being connected to the object through the pilot drum 46 and pilot cable 48. The lever 57 which is restrained by the detent 58 is adapted when released to impart a predetermined motion to the shaft 50 in addition to that imparted by the pilot motor 56. The operation of the entire system may best be seen by a consideration of the movements which take place in sequence during a typical plane lifting operation. Starting with conditions as illustrated in Fig. 16 wherein the motor 26 is not energized and with the lever 57 latched by the detent 58 in its right hand position, the pilot drum 46 may be operated to pay out the pilot cable 48 by energizing the motor 56 which acts through the shaft 54, differential 52, shaft 50, differential 42, and shaft 44, rotating in the direction of the arcuate arrows shown in Fig. 16. The straight arrows in all cases indicate the direction of flow of power. In instances where there is no shaft rotation but merely a reaction torque, the direction of this torque is indicated by dotted arrows.

Momentarily at the start of this operation, the travelling nut 70 and spring 72 hold the detent 74 against the ratchet 76, preventing winding in motion of the drum 46. The spring 72 however permits the drum 46 to turn in a paying out direction, the ratchet 76 clicking by under the detent 74. After sufficient pilot cable has been paid out for the pilot aboard the plane to fasten the end thereof to the plane allowing sufficient slack to avoid jerking, the pilot motor 56 may be reversed causing the slack to be taken up until the same is taut. As soon as the pilot line 48 becomes taut a torque reaction is produced in the shaft 40 as shown by the dotted arrows. This torque, produced by motor 56 and arising from resistance of the plane to the upward pull of line 48 is sufficient to overcome spring 33 and to start levers 32 and 28 moving clockwise from the position of Fig. 16. At about this time the motor 26 may also be energized causing the pump 24 to turn over at a constant speed and to deliver fluid to the motor 22 proportionately to the displacement of the lever 28 from neutral position.

This stage of operation is illustrated in Fig. 17. The tension maintained in the pilot cable 48 is preferably sufficient to support the coupling member 14 against the force of gravity even though the plane to be picked up is not directly under the boom of the crane over which the hoisting line 12 runs. This tension depends on the force exerted by spring 33.

The continued operation of the pilot motor 56 first causes the levers 32 and 28 to move to the right of neutral position so that the pump 24 is placed on stroke in a lowering direction. The main drum thus pays out the hoisting cable 12. As soon as the fluid motor 22 starts to move, however, the shaft 36 starts to move also, being geared thereto by gearing 38. Thus the lever 32 being differentially connected to shafts 36 and 40 is made dependent on the difference in rotation between the pilot motor 56 and the fluid motor 22 (assuming for the moment that pilot drum 46 remains stationary). Accordingly the stroke of pump 24 is controlled so that the motor 22 turns at a speed proportional to the speed of motor 56. There is a further control of the speed of motor 22 which operates concurrently with this control and modifies the action thereof. This additional controlling effect is introduced by the up and down motion of the plane on the water which is transmitted through pilot cable 48, drum 46, shaft 44 and differential 42 to the shaft 40. Thus if the plane moves up on a wave the shaft 44 turns in the direction of the dotted arrow in Fig. 17. This is in the same direction as the torque applied thereto by spring 33 so that the spring is permitted to contract, moving levers 32 and 28 counterclockwise and thus reducing the speed at which the main cable is lowered, and even moving so far as to cause the main drum to haul in cable temporarily. Preferably the normal speed of pilot motor 56 is such as to cause the cable to be paid out normally at a much lower speed than the maximum plane velocity on the waves. If the plane moves down on a wave the action is opposite so that the lowering speed of the main cable is increased. The result is that the coupling member moves downwardly at a varying rate relative to the end of the boom but at a constant rate relative to the plane (the speed of pilot motor 56 being considered constant).

Figure 18:
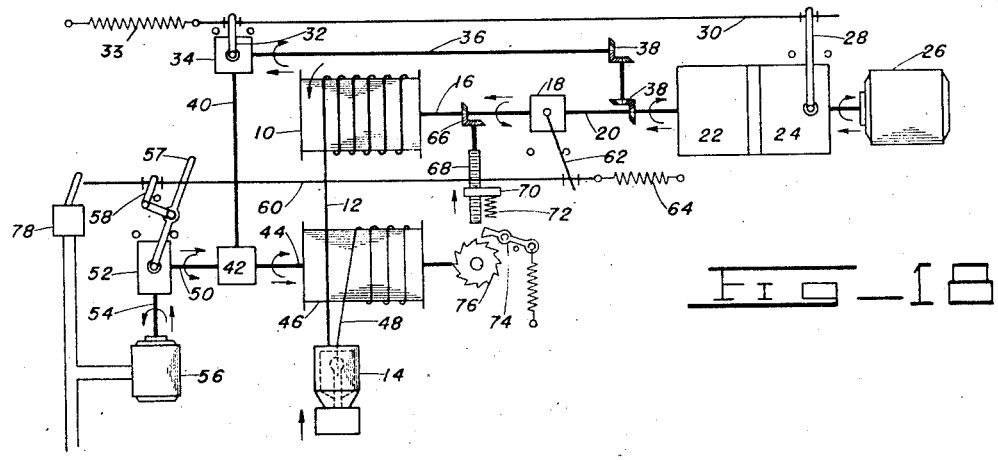
Fig. 18 is a view corresponding to Fig. 16 showing the parts in the positions occupied immediately prior to the establishment of the hoisting connection.

As soon as the coupling member 14 has passed on to the coupling member associated with the plane, automatic engagement of the two coupling members is established as follows. So long as the downward speed of the coupler 14 relative to the plane is substantially lower than the average speed of the plane up and down on the waves, it follows that the coupling members will first move into engagement while the plane is in a trough. The coupling members will therefore over-engage as shown in Fig. 18. Thereafter as soon as the plane begins to be accelerated downwardly as it ascends the next wave crest, the upward speed of the member 14 is decreased through the action of the differential 42. There is a slight lag however represented by the range of motion of the lever 28 which is inherent in all follow-up mechanisms, so that when the upward velocity of the plane begins to decrease, the coupler 14 continues its high velocity upward movement for an instant before its upward velocity is decreased to correspond to that of the plane; but in so doing the inner mechanism of the coupling member 14 (later to be described) comes into operative engagement with the coupling member on the plane, preventing further separation of the two coupling members. Since the plane is moving upwardly at this instant at something less than the maximum upward velocity induced by the waves, the plane is picked off the water automatically at the ideal time.

Figure 19:
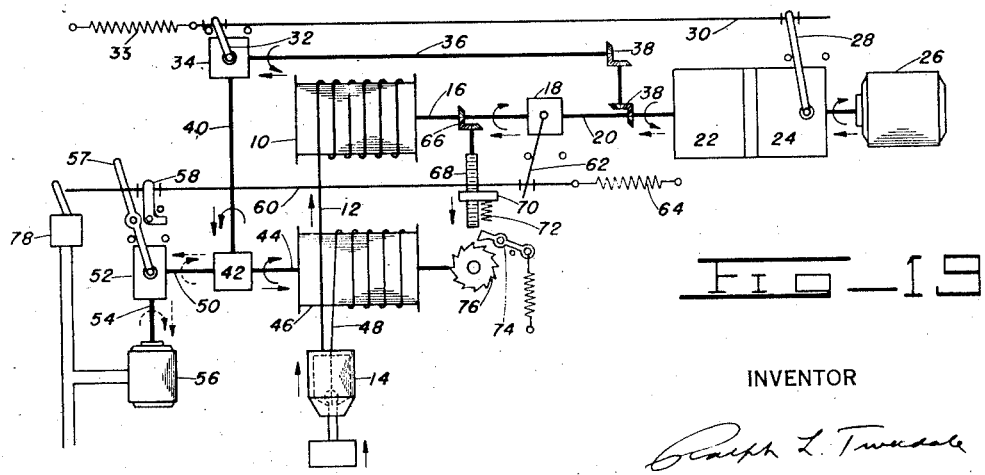
Fig. 19 is a view corresponding to Fig. 16, showing the parts in the positions occupied during hoisting of the object.

As soon as a substantial portion of the weight of the plane is transferred to the hoisting cable 12, a reaction torque appears at lever 62 and the spring 64 allows the push rod 60 to move into the position illustrated in Fig. 19 thus tripping the detent 58 and permitting an additional increment of rotation to be imparted to the shaft 50 in the direction of the arrow illustrated in Fig. 19. This movement occurring at differential 52 is twice as great as the movement taking place at the differential 18 so that as the lever 57 moves to the position in Fig. 19 the lever 32 has not only been prevented from responding to the motion of shaft 20 ahead of drum 10 (which would cause lever 32 to move clockwise) but also has been moved ahead, counterclockwise into a position where the motor 22 is caused to drive the hoisting drum at a faster speed in a winding in direction. The movement of the push rod 60 also operates the switch 78 to stop the pilot motor 56 so that with the parts thus positioned, the drum 10 continues to turn, hoisting the airplane. Thereafter when it is desired to stop the upward movement, the lever 57 may be operated by hand into the vertical position thus acting through the differentials 52, 42 and 34 to restore the control lever 28 to neutral position. After the crane boom has been swung around to bring the plane over the deck, the lever 57 may be moved further clockwise to cause lowering of the plane.

In the preferred form of the invention illustrated in Figs. 1 through 15, the mechanism is somewhat differently arranged and several of the differential gearings illustrated in Fig. 16 does not appear as such, although the various elements are related for differential action in an equivalent manner. Referring now to Fig. 1 there is illustrated an airplane crane having a boom 80 attached to a mast 82 and over which a hoisting cable 84 is run for picking up a sea plane or other floating object 86. One end of the cable 84 carries an automatic coupler 88 while the other end is wound on a hoisting drum 90. A pilot cable 92 is also threaded along the boom 80 and leads to a pilot drum 94 located at one end of variable speed transmission 96. The latter comprises a pump 98 and a fluid motor 100, the former being driven by an electric motor 102. Also driven from the motor 102 by belt drive 104 is an auxiliary pump 106 for the purpose of supplying fluid under pressure for operating the control mechanism.

Referring now to Fig. 2, the shaft 108 of the fluid motor 100 has keyed thereon a sprocket 110 over which a chain 112 runs to a sprocket associated with the hoisting drum 90. Gearing 116 is also provided for driving the limit stop mechanism. Coupled to the end of the shaft 108 is a sleeve-like member 118 which is journalled in a bearing 120 formed on a standard 122. The member 118 is provided with a hollow cylindrical portion 124 which forms one member of a follow-up or differential valve. Within the member 118 there is mounted a plug member 126 having four fluid pasages 128, 130, 132 and 134 formed therein each of these passages communicating with one of four annular grooves 136, 138, 140 and 142 respectively. The opposite ends of these passages communicate with the pipes 144, 146, 150 and 148 respectively. The plug 126 is supported in a standard 152 at the right-hand end of the pilot drum 94 and at its left-hand end carries a journal portion 154 on which the bearing at the left-hand end of the member 118 runs. The plug 126 is stationary. Journalled on the neck of the plug 126 at the right-hand portion thereof is a flanged sleeve member 156 which carries on its periphery a plurality of beveled planet pinions 158 mounted for free rotation on studs 160. Keyed to the right-hand end of the sleeve 156 is a worm wheel 162 which meshes with a worm 164. The latter is carried in a casing 166, freely rotatable on the sleeve 156, and is driven by a pilot electric motor 168 (Fig. 4) mounted on a bracket 170 formed on the casing 166. The pilot motor 168 is preferably of the type including an automatic spring loaded brake which is engaged at all times except when the motor is energized. The casing 166 carries a lug 172 adapted to be engaged by a detent 174 pivoted at 176 on the standard 152. Stop pins 178 and 180 limit the angular movement of the casing 166 to a predetermined arc. The detent 174 is normally biased into the position illustrated in Fig. 4 by a spring 182 and is operable by a push rod 184 slidable in bearings 186 on the standard 152. A hand operated detent 188 is also pivoted at 176 and operable by means of a hand lever 190 (Fig. 2) into and out of engagement with the lug 172. The right-hand end of the push rod 184 is arranged to operate an electric switch 192 through a lever 194 whenever the push rod moves to the right from the position illustrated in Fig. 4. A foot pedal 196 is arranged to permit manual return of the switch 192 to the "on" position after it has been operated to the "off" position by the push rod 184.

Referring again to Fig. 2, the pilot drum 94 is journalled at its right-hand end on the sleeve 156 at bearing 198 while at its left-hand end it is journalled on the standard 122 at a bearing 200. The right-hand end head of the drum 94 is removably attached thereto by bolts 202 and carries a beveled gear 204 with which the pinions 158 mesh. Rotatably mounted on the cylindrical portion 124 of the sleeve member 118 is a second follow-up valve member 206 which has formed on its right-hand end a beveled gear 208 also meshing with the pinions 158. The valve member 206 is thus differentially connected to the pilot drum 94 and to the worm wheel 162 which is driven by the pilot motor 168. Means are provided for limiting relative motion between the valve members 124 and 206, which, as shown in Fig. 3, comprise a pair of abutment pins 210, extending through slots 212 formed in the member 206, and secured to the member 124. The member 206 also carries abutments 214 between which and the abutments 210 springs 216 are mounted for urging the member 124 counterclockwise in Fig. 3 relative to the member 206. These springs are together of sufficient strength to maintain on the pilot cable 92 a tension which will support the coupling member 88 even though the pilot cable 92 be disposed at a considerable angle to the vertical in that portion which extends from the end of the boom to the airplane.

Referring now to Fig. 7, the cylindrical surface of the follow-up valve is there illustrated in a developed view in which it will be seen that the outer member 206 is provided with four longitudinal slots 218, 220, 222 and 224 equally separated around the internal periphery thereof. The inner member 124 is provided with a plurality of elliptical through holes by which communication may be established between the various slots in the outer member and selected ones of the grooves 136—142 formed on the outer surface of the plug member 126. Thus when the outer member 206 moves to the left in Fig. 7 relative to the member 124, the grooves 218 and 222 are connected with annular grooves 136 and 140 permitting fluid to pass from the pipe 144 which is the discharge line from the pump 106 into the pipe 150 which leads to the left-hand end of a control cylinder 226 for regulating the displacement of the pump 98 (see Fig. 8). Likewise the slots 220 and 224 form connections between the annular grooves 138 and 142 permitting fluid to pass from the pipe 146 to the pipe 148 thus permitting fluid to discharge from the right-hand end of the cylinder 226 to the intake of the pump 106. When the outer member 206 moves in the opposite direction relative to the inner member 124 the connections between the cylinder 226 and the pump 106 are reversed. It will be seen that this valve structure makes the connections described in accordance with only relative movements between the members 124 and 206 and is independent of any simultaneous movement of these two members. In other words, both the member 124 and member 206 may be revolving at any speed and the only way in which a change in valve connections can be made is for one member to get ahead of the other.

Slidably mounted in a bore in the standard 122 is a detent 228 having a beveled nose engageable with ratchet teeth 230 formed in the left-hand end face of the member 206. The detent 228 is urged by a spring 232 to the right in Fig. 2 and may be retracted by a lever 234 pivoted at 236 and which is connected to an operating rod 238. The latter is under control of limit stop mechanism illustrated in Fig. 13 and which may be a part of a conventional type of travelling nut limit switch. Thus the shaft 240 may be driven from the gearing 116 and carries a travelling nut 242 which is engageable with adjustably positioned limit switches 244 for controlling the main motor 102. The rod 238 is slidably mounted in the frame of the limit switch mechanism and carries an adjustable lug 246 engageable with the travelling nut 242. A spring 248, stronger than spring 232, normally urges the rod 238 to the right in Fig. 13. Thus whenever the main hoisting drum is operated to bring the coupling member 88 nearly up to the boom 80 the nut 242 engages the lug 246 pulling lever 238 to the left against the spring 248, permitting the spring 232 to move the detent 228 into engagement with ratchet teeth 230 and thus preventing further movement of the valve member 206 under the urging of the springs 216.

Referring now to Figs. 1, 9 and 10, the drive from the chain 112 to the main drum 90 incorporates a torque measuring differential mechanism which includes a sprocket 250 over which the chain 112 runs. The latter is mounted on a hub 252 keyed to the shaft 254 of the drum 90. Bolts 256 extend through slots 258 in the sprocket 250 and are secured to the hub 252 to limit the angle of relative movement between sprocket 250 and the hub 252. Spring abutments 260 are formed on the interior of a flange 262 integral with the sprocket 250 while spring abutments 264 are formed on the hub member 252. Between these abutments are mounted strong compression springs 266 so calibrated as to support a substantial portion of the weight of a plane before starting to deflect. Formed on the right-hand end of the shaft 254 is a male thread member 268 which cooperates with a female thread member 270 which is slidably keyed to the sprocket 250 at 272. The member 270 carries a socket 274 in which the end of a push rod 276 is engaged. The latter is connected through a bell crank mechanism 278 (see Fig. 1) with the push rod 184, illustrated in Fig. 4.

The construction of the automatic coupling mechanism is illustrated in Figs. 11 and 12 in which it will be seen that a coupling member 280 is attached to the object to be lifted. This member is provided with a cylindrical stem 282 having an integral ball head 284. The member is provided with a central bore 286, the lower portion of which is enlarged as at 288 (Fig. 12). The bore 286 is open on its front side as seen in Fig. 11 by a slot 290 having an enlarged portion 292 at its lower end. The end of the pilot cable 92 carries a slug 294 which may be passed through the enlarged slot 292 and drawn upwardly to the position illustrated in Fig. 12 whereby the cable 92 becomes attached to the coupling member 280.

The coupling member 88 is formed with an interior bore 296 having an inwardly tapered portion 298 in which three or more jaws 300 are adapted to slide. A pressure plate 302 is urged downwardly by springs 304 whereby the jaws 300 are urged inwardly by the cam action of the conical surface 298. The jaws 300 are provided with internal spherical surfaces 306 adapted to fit the head portion 284 of the coupling member 280. A bore 308 is provided whereby the pilot cable 92 may be threaded centrally through the coupling member 88.

The pilot motor 168 is of the reversible type and may be controlled by any suitable circuit such as that illustrated in Fig. 15. The common connection 310 for both forward and reverse windings is connected to one side of the line 312. The forward winding is connected by conductor 314 with one set of contacts of a switch 316 while the reverse winding is connected by conductor 318 with the opposite contacts of the switch 316. Both windings are in series with the automatically operated "on-off" switch 192 which is operated by the push rod 184 and the foot pedal 196. The switch 316 may be operated by a hand lever 322 to energize either the forward winding or the reverse winding or neither, whenever the switch 192 is closed. Auxiliary momentary contact push buttons 324 and 326 are provided for energizing the forward and reverse windings respectively when the switch 192 is open. The switches for controlling motor 168 may be positioned in a control box 327 conveniently mounted on the standard 152.

In order to permit the use of a smaller hydraulic transmission than could otherwise be used, fluid motor 100 is preferably provided with a displacement varying mechanism comprising a fluid motor 328 one end of which is connected by a pipe 330 to the main working circuit of the transmission on the side which is under pressure when the crane is loaded. An adjustable spring 332 counteracts the pressure exerted through the pipe 330 and is so calibrated that while the coupling member 88 is not connected with the plane, the motor displacement is small resulting in high speed operation of the drum 90. When the weight of the plane comes on the hoisting cable 84 the resulting pressure overcomes the force of the spring 32 moving the motor 100 into full displacement thus providing additional torque capacity during hoisting when high speed operation for following the wave movements is unnecessary. In addition, should a higher wave come along immediately after the plane is picked up, and the water again support the plane and move it upward faster than the normal hoisting speed, the pressure in pipe 330 falls off permitting spring 332 to decrease the motor stroke and thus increase the speed of hoisting to maintain the cable 84 taut under these conditions.

The operation of this form of invention is essentially similar to that described in connection with Figs. 16 and 18. Instead of controlling the stroke of the pump 98 by a lever connection this factor is under the control of the differentially operating follow-up valve structure within drum 94. This operates through the hydraulic motor 226 to control the pump stroke in accordance with the difference in relative rotation between the motor output shaft 108 and the output of the differential gear within the drum 94. The pilot electric motor 56 drives the worm gear 162 direct instead of through a differential gear as illustrated in Fig. 16, the function of the differential gear 52 being provided by the rotatable mounting of the worm housing 156 as a whole. While a hand lever may, if desired, be placed on the housing 156 for manual rotation thereof when it is desired to stop or lower the plane after it is hoisted, it is preferred to utilize the momentary contact push buttons 324 and 326 for this purpose.

If it is desired to utilize the crane as a temporary mooring device for a plane by maintaining a constant tension on the hoisting cable, the hand operated detent 188 may be engaged with the lug 172. The housing 166 is thus maintained stationary when the push rod 184 trips latch 174 so that the differential valve member 206 is not moved ahead to start hoisting when the weight of the plane comes on the coupling member. Under these conditions the torque measuring device at sprocket 250 permits relative rotation between the shaft 108 and the pilot drum 94 in definite relation to the up and down movements of the plane on the water. This is due to the face that the shaft 108 is connected to the plane through the yielding connection at the torque measuring device while the pilot drum is connected to the plane by an unyielding connection at the pilot cable. This relative rotative movement appears at the two members of the differential valve resulting in actuation of the stroke controlling fluid motor in a manner to cause the main drum to follow the wave movements.

While the form of embodiment of the invention as herein disclosed, constitutes a preferred form, it is to be understood that other forms might be adopted, all coming within the scope of the claims which follow.

What is claimed is as follows:

1. In a device for hoisting an object floating in a seaway the combination of a winch, variable speed means for driving the winch, a hoisting line connected to the winch and carrying a coupling member, a pilot line having a portion paralleling the hoisting line, means for connecting the pilot line to the object, said coupling member being slidable along said pilot line toward the object to be hoisted, a coupling member connected to the object, and means associated with one of said coupling members for automatically causing a sustaining connection to be established upon engagement of one coupling member with the other.

2. In a device for hoisting an object floating in a seaway the combination of a winch, variable speed means for driving the winch, a hoisting line connected to the winch and carrying a coupling member, a pilot line having a portion paralleling the hoisting line, means for connecting the pilot line to the object, said coupling member being slidable along said pilot line toward the object to be hoisted, a coupling member connected to the object, and means for maintaining on said pilot cable sufficient tension to maintain the pilot line substantially straight when the pilot line is out of vertical position and must partially support the first coupling member.

3. In a device for hoisting an object floating in a seaway the combination of a winch, variable speed means for driving the winch, a hoisting line connected to the winch and carrying a coupling member, a coupling member connected to the object, means associated with one of said coupling members for automatically causing a load sustaining connection to be established upon engagement of one coupling member with the other, and means for controlling the driving means to cause the object to be lifted clear of the water, said last means being responsive to the first drop in the upward speed of the object after said connection is established.

4. In a device for hoisting an object floating in a seaway the combination of a winch, variable speed means for driving the winch, a hoisting line connected to the winch and carrying a coupling member, a pilot line having a portion paralleling the hoisting line, means for connecting the pilot line to the object, said first coupling member being slidable along said pilot line toward the object to be hoisted, a coupling member connected to the object, and means at the winch for maintaining on said pilot cable sufficient tension to maintain the pilot line substantially straight when the pilot line is out of vertical position and must partially support the first coupling member.

5. In a device for hoisting an object floating in a seaway the combination of a winch, variable speed means for driving the winch, a hoisting line connected to the winch and carrying a coupling member, a pilot line having a portion paralleling the hoisting line, means for connecting the pilot line to the object, said first coupling member being slidable along said pilot line toward the object to be hoisted, a coupling member connected to the object, and power driven means for maintaining on said pilot cable sufficient tension to maintain the pilot line substantially straight when the pilot line is out of vertical position and must partially support the first coupling member.

6. In a device for hoisting an object floating in a seaway the combination of a winch, variable speed means for driving the winch, a hoisting line connected to the winch and carrying a coupling member, a pilot line having a portion paralleling the hoisting line, means for connecting the pilot line to the object, said first coupling member being slidable along said pilot line toward the object to be hoisted, a coupling member connected to the object, means for maintaining on said pilot cable sufficient tension to maintain the pilot line substantially straight when the pilot line is out of vertical position and must partially support the first coupling member, and means operated differentially from said pilot line and said hoisting line for controlling the paying out and hauling in of the hoisting line, and manually controlled means for winding in one end of the pilot line whereby the hoisting line is paid out proportionally to the winding in of the pilot line.

7. In a device for pulling on a load element subject to varying external forces counteracting the pull the combination of a variable speed motive element, a control element operable to control the speed of the motive means, a force measuring element operable to deflect a predetermined amount when a predetermined pull is exerted on the load element, a manually controllable pilot controlling element, an automatically operable pilot controlling element, and operative connections between said six elements; said control element, said force measuring element, and said pilot controlling element, each being connected for differential action with respect to the motion of two of the other elements.

8. In a device for pulling on a load element subject to varying external forces counteracting the pull the combination of a variable speed motive element, a control element operable to control the speed of the motive means, a force measuring element operable to deflect a predetermined amount when a predetermined pull is exerted on the load element, a manually controllable pilot controlling element, an automaticay operabe pilot controlling element, and operative connections between said five elements, said control element, said force measuring element, and said pilot controlling element, each being connected for differential action with respect to the motion of two of the other elements, and means responsive to the imposition of a predetermined load on the pulling element for operating said automatically operable pilot controlling element.

9. In a device for hoisting an object floating in a seaway the combination of a winch, variable speed means for driving the winch, a hoisting line connected to the winch and carrying a coupling member, a coupling member connected to the object, means associated with one of said coupling members for automatically causing a load sustaining connection to be established upon engagement of one coupling member with the other, and means responsive to the establishment of said connection for controlling the driving means to cause the object to be positively hoisted clear of the water.

10. In a device for hoisting an object floating in a seaway the combination of a winch, variable speed means for driving the winch, a hoisting line connected to the winch and carrying a coupling member, a coupling member connected to the object, means associated with one of said coupling members for automatically causing a load sustaining connection to be established upon engagement of one coupling member with the other, means for controlling the driving means to cause the coupling members to approach each other and engage during an upward movement of the object on a wave, and responsive to engagement of said coupling members to control the driving means to cause the object to be lifted clear of the water while on the crest of a wave.

11. The method of lifting an object floating in a seaway which comprises fastening a pilot line to the object, sliding a hoisting line and coupling member down the pilot line as a guide to the object, and maintaining sufficient tension on the pilot line to guide the coupling member directly to the object when the pilot line is materially out of vertical position.

12. The method of lifting an object floating in a seaway which comprises fastening a pilot line to the object, sliding a hoisting line and coupling member down the pilot line as a guide to the object, and utilizing the upward motion of the object on a wave to make a connection between the object and the hoisting line.

13. The method of lifting an object floating in a seaway which comprises lowering a hoisting line to the object, and connecting the line to the object by the first upward motion of the object on a wave after the line has reached the object.

RALPH L. TWEEDALE.